US005502512A

United States Patent [19]
Toyoda et al.

[11] Patent Number: 5,502,512
[45] Date of Patent: Mar. 26, 1996

[54] APPARATUS AND METHOD FOR DIGITAL VIDEO AND AUDIO PROCESSING A PLURALITY OF PICTURES AND SOUNDS

[75] Inventors: Toshihiro Toyoda, Moriguchi; Yoshihiro Mori, Hirakata; Hidemasa Kitagawa, Toyonaka, all of Japan

[73] Assignee: Matsushita Electric Industrial Co., Ltd., Kadoma, Japan

[21] Appl. No.: 218,760

[22] Filed: Mar. 28, 1994

[30] Foreign Application Priority Data

Mar. 29, 1993 [JP] Japan .................................. 5-069620

[51] Int. Cl.⁶ .................................................. H04N 5/268
[52] U.S. Cl. ........................ 348/706; 348/721; 348/584
[58] Field of Search ................................... 348/705, 706, 348/721, 584, 720, 722; H04N 5/268, 9/14

[56] References Cited

U.S. PATENT DOCUMENTS

| | | | |
|---|---|---|---|
| 4,363,104 | 12/1982 | Nussmeier | 348/721 X |
| 4,808,992 | 2/1989 | Beyers, Jr. et al. | 348/706 |
| 4,942,470 | 7/1990 | Nishitani et al. | 348/721 |
| 5,168,361 | 12/1992 | Hackmann | 348/721 |
| 5,253,060 | 10/1993 | Welmer et al. | 348/721 |

FOREIGN PATENT DOCUMENTS

| | | |
|---|---|---|
| 4-115764 | 4/1992 | Japan . |
| 4-345985 | 12/1992 | Japan . |
| 5-167601 | 7/1993 | Japan . |

Primary Examiner—Victor R. Kostak
Attorney, Agent, or Firm—Ratner & Prestia

[57] ABSTRACT

An apparatus for digital video and audio processing including information input and output processing devices for input, output, and processing of pictures and sounds. An information transmission device is provided for transmitting video and audio information between adjacent information input and output processing devices in one direction. The information transmission device connects the information input and output processing devices to a control device which controls the information input and output processing devices. A bus is also provided for transferring video or audio information or control information to the information input and output processing devices. An input terminal is used to enter control information into the control device.

11 Claims, 2 Drawing Sheets

APPARATUS AND METHOD FOR DIGITAL VIDEO AND AUDIO PROCESSING A PLURALITY OF PICTURES AND SOUNDS

FIELD OF THE INVENTION

The present invention relates to apparatus and method for digital video and audio processing for operating and processing plural pictures and sounds, in particular, information of plural moving pictures and sounds, in real time.

BACKGROUND OF THE INVENTION

To meet demands for diversification of video expression, recently, various video effects by operating and processing plural pictures by applying digital technology are realized, such as video effects of converting from one picture to other picture by dissolving or wiping, and putting a slave picture into a master picture and moving and rotating the slave picture therein, and further complicated processes are requested.

As the prior art relating to video processing, in the Japanese Laid-open Patent 4-115764/92, video or audio information stored in plural file devices is sent out to plural independent user terminals by passing through a file input changeover device. In this constitution, however, it is not guaranteed that plural pictures or sounds can be sent out to a same terminal.

In the Japanese Laid-open Patent 4-345985/92, comprising I/O for various information inputs and outputs, buffers for various pieces of information, a hard disk for storing information, and buses for connecting them, data is transferred synchronously by input and output of information between the hard disk and I/O for input and output through buffers corresponding to respective pieces of information. In this constitution, since it is not designed to operate and process plural input pieces of information and transfer as one piece of information, transfer of information over the transfer capacity of bus is not guaranteed.

As the means for combining pictures, the video editing apparatus disclosed in the Japanese Laid-open Patent 4-86163/92 and the video information processing apparatus disclosed in the Japanese Laid-open Patent 2-94781/90 are known.

In both of them, using a switch (changeover circuit), input pictures are stored in individual memory regions, and combined, but pictures of any arbitrary number of inputs cannot be combined, and transfer of sound and synchronism with picture are not disclosed.

Hitherto, if processing in the I/O for input and output differs with the kind of information, it was difficult to synchronize various data precisely. For example, when pictures and sounds are combined, in complicated video processing, once the pictures are stored in the memory and processed, which causes a time lag, and hence it results in a delay, through very slightly, from the sound.

SUMMARY OF THE INVENTION

It is hence a primary object of the invention to present an apparatus for digital video and audio processing for processing an arbitrary input number of pictures, sounds, or combined pictures and sounds, simultaneously while keeping synchronism in time.

To achieve the object, the invention presents an apparatus for digital video and audio processing comprising plural information input and output processing means for input, output or processing of pictures or sounds, information transmission means for transmitting video and audio information between adjacent information input and output processing means in one direction by connecting these plural information input and output processing means, control means for controlling the plural information input and output processing means, bus means for transferring video or audio information or control information by equivalently connecting the control means and plural information input and output processing means, input means for entering the control information into the control means, and output means for issuing the video output or audio output of the plural information input and output processing means.

In this constitution, the apparatus for digital video and audio processing of the invention transmits the output of each information input and output processing means sequentially to the adjacent information input and output processing means by the information transmission means while controlling the plural information input and output processing means by the control means, and simultaneously processes an arbitrary input number of pictures or sounds while keeping synchronism in time, by combining the added information inputs by the information input and output processing means.

More preferably, by installing delay means in the information input and output means, when transmitting the video or audio information to adjacent information input and output means, delay is processed so that the time relation of individual pieces of information may be same as at the time of input.

DESCRIPTION OF THE PREFERRED EMBODIMENT

Figure 1:
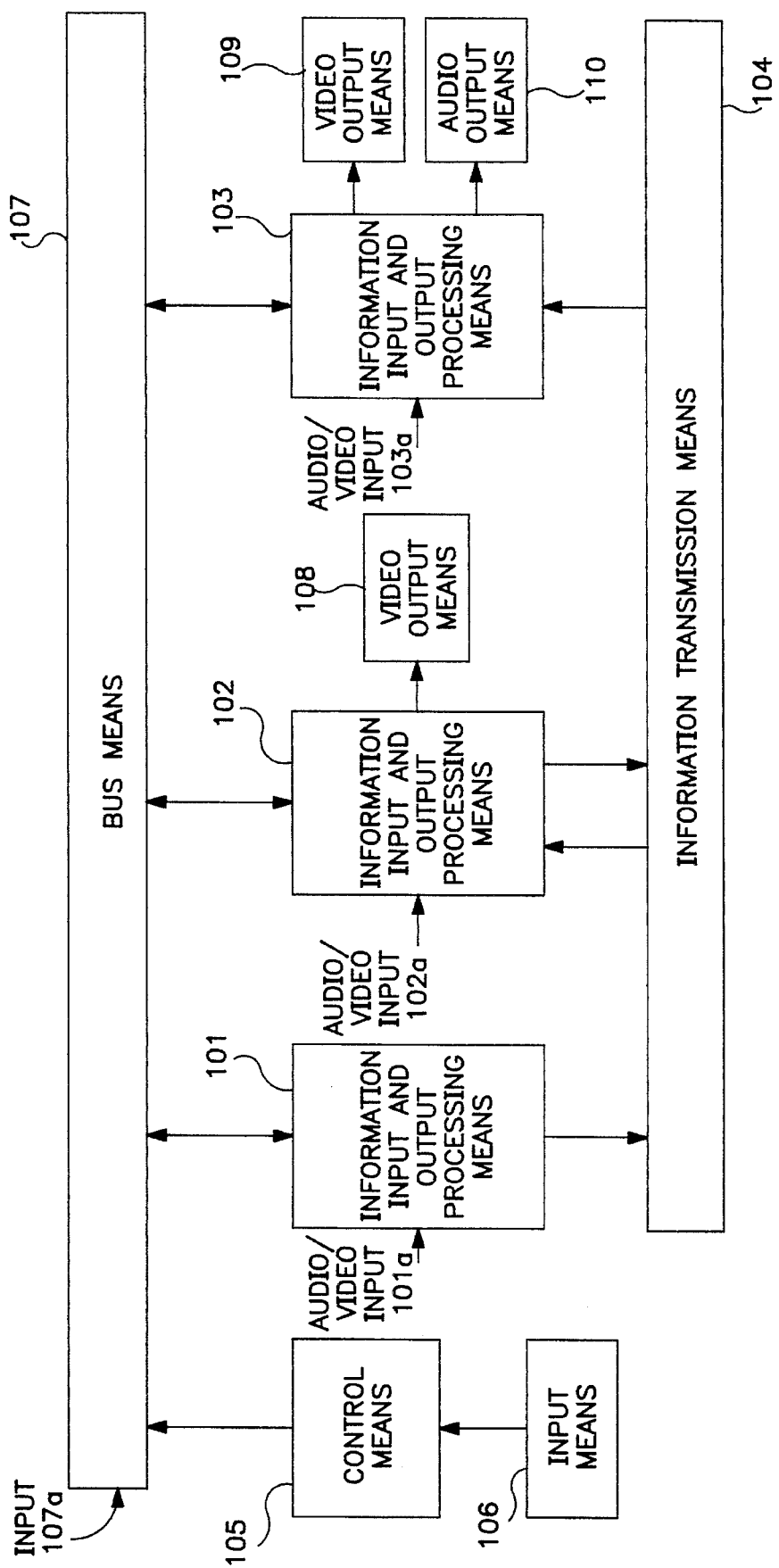
FIG. 1 is a block diagram of an apparatus for digital video and audio processing in an embodiment of the invention.

Referring now to the drawings, an embodiment of the invention is described below. FIG. 1 is a block diagram of an apparatus for digital video and audio processing of the invention.

In FIG. 1, numerals 101, 102, and 103 are information input and output processing means for entering video or audio information, and putting out directly or after arithmetic processing of video or audio information, 101*a*, 102*a*, and 103*a* are for entering video and audio inputs into the information input and output processing means 101, 102, and 103, respectively, 104 is information transmission means for transmitting video and audio information in one direction between adjacent information input and output processing means, 105 is control means for controlling the information input and output processing means 101, 102, and 103, 106 is input means for entering control information into the control means 105, 107 is bus means for transferring video, audio or control information, 107*a* is an input terminal for entering the video or audio information into the bus means 107, and 108, 109, and 110 are output means.

Below is explained a case in which the output means 108 and 109 are display means for displaying pictures, and 110 is audio output scans for delivering sounds.

In thus composed apparatus for digital video and audio processing, the operation is described below. The three information input and output processing means 101, 102, and 103 are connected to the information transmission means 104 for transmitting video and audio information in one direction between adjacent information input and output processing means, respectively, and the video or audio information sent out from the information input and output processing means 101 is entered into the information input and output processing means 102 through the information transmission means 104, and the video or audio information sent out from the information input and output processing means 102 is further entered into the information input and output processing means 103 through the information transmission means 104.

Concerning other operations, actions can be freely set in the information input and output processing means 101, 102, and 103 by the control means 105, for example, the video or audio information is fed in or sent out of the bus means 107 or the outside, or entered from the input terminals 101*a*, 102*a*, and 103*a*, and the bus means 107 or the information input and output processing means in the previous stage, or the internally generated video or audio information is operated and processed.

This control is entered into the control means 105 through the input means 106, and the control means 105 controls the information input and output processing means 101, 102, and 103 through the bus means 107.

One information input and output processing means is, though variable with the constitution, capable of simultaneously operating and processing for synthesis processing of two pictures and synthesis of two sounds, in principle. In the example of video information, one piece of information that is not synthesized may be directly sent out into the information transmission means 104 without arithmetic processing. In the example of operation not to be synthesized, there is a video effect such as change of color of one video information, fade-in, or fade-out.

In the example of synthesis operation of two pieces of video information, there is a video effect such as conversion from one picture to other picture by dissolving or wiping, or putting a slave picture into a master picture, and moving and rotating the slave picture therein.

As for audio information, one piece of audio information may be unchanged, or changed in tone, or delivered by changing the volume, in possible operations, or in the case of two pieces of audio information, synthesis such as mixing, and fade-out of one and fade-in of the other may be considered.

The information transmission means 104 is for information transmission only, and hence the transmission speed is fast, but since the bus means 107 is limited in transmission speed because of interrupt of control information from the control means 105 or the like, and therefore when processing by entering video information from the bus means 107 into the information input processing and output means 101, the data must be stored in the image memory provided in the information input processing and output means 101.

In this processing, the video or audio information can be applied simultaneously into one information input and output processing means.

In the information input and output processing means 101, the video information or audio information entered from either the input terminal 101*a* or the bus means 107 is directly issued to the information transmission means 104, or the video or audio information processing and operating up to two pieces of input video information or audio information is issued to the information transmission means 104, and the information transmission means 104 transmits the output only to the adjacent information input and output processing means 102, and does not transmit to the information input and output processing means 103.

The video information or audio information given to the information input and output processing means 102 from the information input and output processing means 101 through the information transmission means 104 is directly sent out to the information transmission means 104, or the video or audio information transmitted through the information transmission means 104 from the information input and output processing means 101 and the video or audio information entered from other than the information transmission means 104 in the information input and output processing means 102 are operated and processed, and similarly again transmitted to the adjacent information input and output processing means 103 by the information transmission means 104.

The information input and output processing means 103 similarly sends out the information given to the information input and output processing means 103 from the information transmission means 104 directly to the information transmission means 104, or the video or audio information transmitted through the information transmission means 104 from the information input and output processing means 102 and the video or audio information entered from other than the information transmission means 104 to the information input and output processing means 103 are operated and processed.

The operations of the information input and output processing means 101, 102, and 103 are controlled by the control means 105 in which the control information is entered from the input means 106. Herein, the bus means 107 equivalently connects the information input and output processing means 101, 102, and 103, and the control means 105, and transmits video information, audio information and control information between them.

Display means 108 and 109 are for displaying the output images of the information input and output processing leans 102 and 103, respectively.

Therefore, the display means 109 displays the output image after execution of all processes in the information input and output processing means 101, 102, and 103, while the display means 108 displays the output image processed in the information input and output processing means 101 and 102. The same applies to the sound, and the audio output means 110 delivers the sound after execution of all processes in the information input and output processing means 101, 102, and 103.

These display means and audio output means may be changed to necessary positions without fixing the connection points, which may be effected by the control means 105.

As the output means, instead of the display means and audio output means, only output terminals may be provided.

Figure 2:
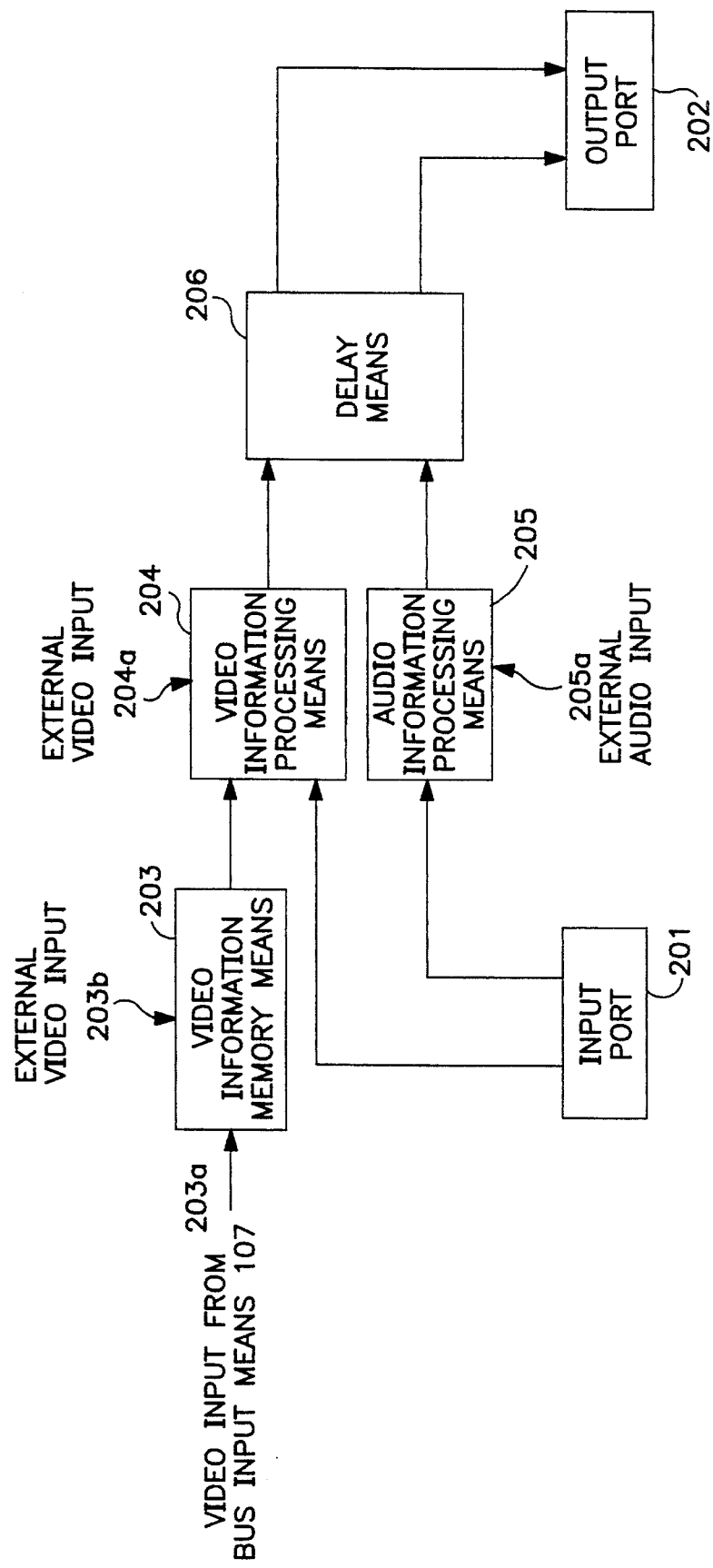
FIG. 2 is a block diagram of information input and output processing means in the apparatus for digital video and audio processing in the embodiment of the invention.

FIG. 2 is an example of block diagram of the constitution of the information input and output processing means in FIG. 1, and this case of information input and output processing means is described below.

In FIG. 2, numeral 201 is an input port, and 202 is an output port, and both are connected to the information transmission means 104 in FIG. 1, and the video or audio information is entered into the input port from the information input and output processing means of the adjacent preceding stage, and is issued from the output port to the information input and output processing means of the adjacent next stage. Numeral 203 is video information memory means, 204 is video information processing means, 205 is audio information processing means, and 206 is delay means.

The image information memory means 203 stores the video information transferred from the bus means 107 in FIG. 1 and entered into a video input terminal 203a or entered from outside through an input terminal 203b, and the video information processing means 204 operates and processes the video information entered from the and input port 201, video information stored in the video information memory means 203, or video information entered from an input terminal 204a.

The audio information processing means 205 processes the audio information entered in the input port 201 or through an audio input terminal 205a from outside.

There is a difference in the processing time of picture and sound by the video information processing means 204 and audio information processing means 205, and the delay means 206 keeps synchronism in time between the two by delaying the output of the video information processing means 204 and the output of the audio information processing seams 205 by individual time lengths, and sends out the individual information to the output port 202.

Generally it takes a longer time to process the image which contains more information, and therefore, without delaying the video information, the time required for processing the sound is subtracted from the time required for processing the picture, and the balance is set as the delay time of the audio information in the delay means 206.

Thus, according to the embodiment, comprising plural information input and output processing means for input, output or processing of picture or sound, and information transmission means for transmitting video and audio information between information input and output processing means serially in one direction by connecting the plural information input and output processing means, the input number of pictures and sounds can be set arbitrarily, and if the input number of pictures or sounds is increased, it is not necessary to increase the information transmission capacity of the bus means, so that plural arithmetic operations can be executed and delivered simultaneously.

By composing the information input and output processing means as shown in FIG. 2, in the apparatus for digital video and audio processing, regardless of the series of processing by using the information transmission means 104, the video information transferred from the bus seams 107 or the video information entered from outside is once accumulated by the video information memory means, and individual processes can be executed without disturbing the time relation between the picture and sound as being adjusted by the delay means after being once processed in the apparatus for digital video and audio processing. Besides, the picture directly entered in the video information processing seams can be processed in the video information processing means, same as the input through the information transmission means.

In this embodiment, three information input and output processing means are used in explanation in FIG. 1, this is only an example, and any number of information input and output processing means may be provided depending on the processing. The output seams is composed of display seams and audio output means, and connected to the information input and output processing means 102 and 103, but the display seams and audio output seams may be connected to any information input and output processing means as far as it is the information input and output processing means having the output function.

We claim:

1. An apparatus for digital video and audio processing comprising:

a plurality of information input and output (I/O) processors, each for receiving, providing, and processing at least one of video information and audio information, information transmission means, coupled to each one of the plurality of information I/O processors, for transmitting the video information and the audio information between adjacent information I/O processors in only one direction from a preceding information I/O processor to subsequent information I/O processors, control means for controlling each one of the plurality of information I/O processors, bus means, coupled to the plurality of information I/O processors and to the control means, for transferring at least one of video information, audio information, and control information between the control means and the plurality of information I/O processors and between the plurality of information I/O processors, and output means, coupled to respective ones of the plurality of information I/O processors, for providing one of (a) a video output and (b) an audio output from a respective one of the plurality of information I/O processors.

2. An apparatus for digital video and audio processing of claim 1, wherein each one of the plurality of information I/O processors comprise an input port for entering information output from an adjacent preceding information I/O processor through the information transmission means, and an output port for sending out the information to an adjacent next information I/O processors.

3. An apparatus for digital video and audio processing of claim 1, wherein each one of the plurality of information I/O processors is at least connected to the bus means, and wherein each one of the plurality of information I/O processors has output terminals for providing one of (a) information to the information transmission means, said information including one of the audio information and the video information, and (b) the information to the information transmission means and to said bus means.

4. An apparatus for digital video and audio processing of claim 1, wherein each one of the plurality of information I/O processors are connected to the bus means, and wherein each one of the plurality information I/O processors includes (a) at least an input port for entering the information provided by an adjacent preceding information I/O processor through the information transmission means, said information including one of the audio information and the video information, (b) other input terminals for receiving the information, and (c) an output port for providing the information to an adjacent subsequent information I/O processor through the transmission means, and the plurality of information I/O processors provides the information to the adjacent subsequent information I/O processor through one of (a) the transmission means and (b) the transmission means and the bus means.

5. An apparatus for digital video and audio processing of claim 1, wherein the output means comprises:

display means for displaying video information of the respective ones of the plurality of information I/O processors, and audio output means for providing sounds from audio information from the respective ones of the plurality of information I/O processors.

6. An apparatus for digital video and audio processing of claim 5, wherein the control means controls so that the display means for displaying video outputs and audio output means for sending out sounds may be connected to desired output points.

7. An apparatus for digital video and audio processing of claim 2, wherein each one of the plurality of information I/O processors comprises:

video information processing means for processing the video information entering from one of (a) the input port and (b) an external input terminal, audio information processing means for processing the audio information entering from one of (a) the input port and (b) the external input terminal, and delay means for delaying at least (a) an output of the audio information processing means, and (b) an output of the video information processing means.

8. An apparatus for digital video and audio processing of claim 2, wherein the information input and output processing means comprises:

video information memory means for storing video information, video information processing means for processing the video information stored in the video information memory means and the video information entering from an input port and external input terminal, audio information processing means for processing the audio information entering from the input port and external input terminal, and delay means for delaying at least the output of the audio information processing means, of the output of the video information processing means and output of audio information processing means, and sending out to the output port.

9. The apparatus for digital video and audio processing as recited in claim 1, wherein the plurality of information I/O processors includes at least two audio processors.

10. The apparatus for digital video and audio processing of claim 1, wherein each one of the plurality of information I/O processors is connected to the bus means; and wherein each one of the plurality of information I/O processors one of (1) processes one of inputted video information and inputted audio information, and provides the processed information to the information transmission means and (2) provides one of the inputted video information and the inputted audio information to the information transmission means; and wherein each one of the plurality of information I/O processors synthesizes one of (a) two of the inputted video information and (b) two of the audio information, and provides the synthesized information to the information transmission means.

11. An apparatus for digital video and audio processing of claim 1, wherein each one of the plurality of information I/O processors are connected to the bus means, and wherein each one of the plurality information I/O processors includes (a) at least an input port for entering the information provided by an adjacent preceding information I/O processor through the information transmission means, said information including one of the audio information and the video information, (b) other input terminals for receiving the information, and (c) an output port for providing the information to an adjacent subsequent information I/O processor through the transmission means, and wherein each one of the plurality of information I/O processors one of (1) processes one of the video information and the audio information, and provides the processed information to the information transmission means and (2) provides one of the video information and the audio information to the information transmission means; and wherein each one of the plurality of information I/O processors synthesizes one of (a) two of the video information and (b) two of the audio information, and provides the synthesized information to the information transmission means.

* * * * *